F. MOSSBERG.
PROCESS FOR MAKING METAL RINGS.
APPLICATION FILED JAN. 10, 1917.
1,263,271.
Patented Apr. 16, 1918.
2 SHEETS—SHEET 1.
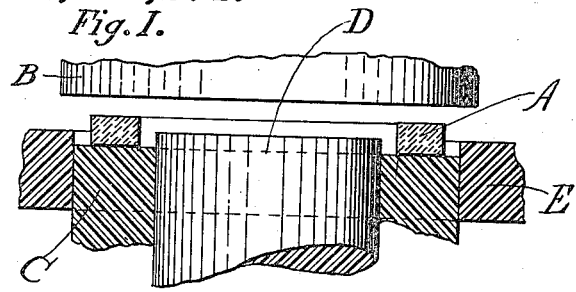
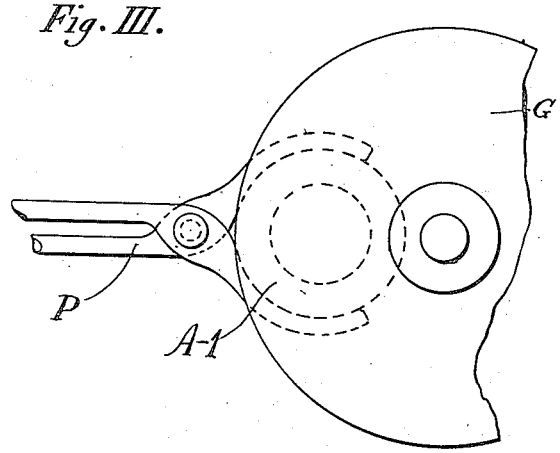
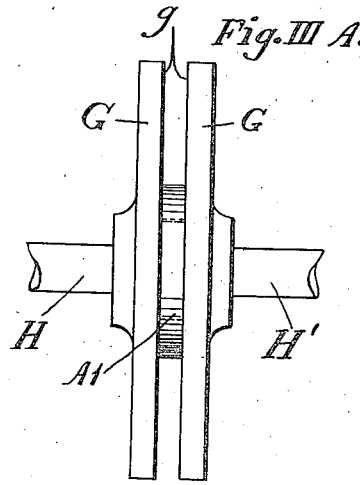
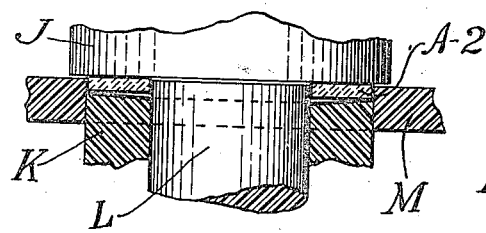
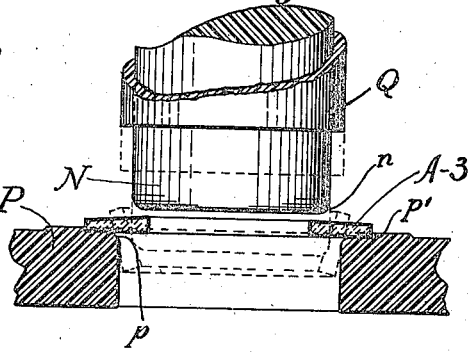
WITNESSES.
Inventor
Frank Mossberg.
By his Attorney F. MOSSBERG.
PROCESS FOR MAKING METAL RINGS.
APPLICATION FILED JAN. 10, 1917.
1,263,271.
Patented Apr. 16, 1918.
2 SHEETS—SHEET 2.
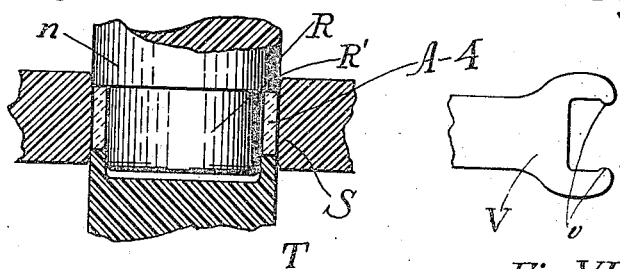
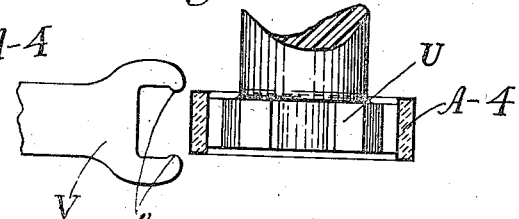
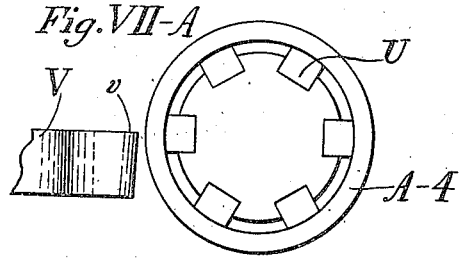
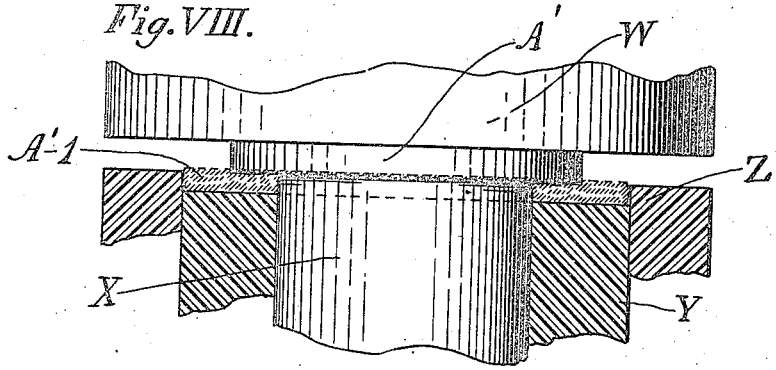
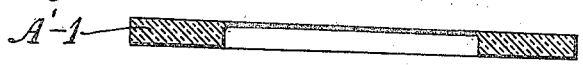
WITNESSES.
Inventor
Frank Mossberg.
By his Attorney

UNITED STATES PATENT OFFICE.

FRANK MOSSBERG, OF ATTLEBORO, MASSACHUSETTS.

PROCESS FOR MAKING METAL RINGS.

1,263,271.  Specification of Letters Patent.  Patented Apr. 16, 1918.

Application filed January 10, 1917. Serial No. 141,559.

*To all whom it may concern:*

Be it known that I, FRANK MOSSBERG, residing in the city of Attleboro, county of Bristol, State of Massachusetts, have invented certain new and useful Improvements in Processes for Making Metal Rings, of which the following is a specification, reference being had to the accompanying drawings, illustrative of one particular embodiment of my invention.

This invention relates to processes for the manufacture of finished metal articles, such as rings made of ductile metal, and among its objects are to effect the maximum saving in the cost of manufacture, not alone in labor, both machine work and machining, but also to effect the maximum saving of material in the producing of the article.

In particular, one application of my process is the production of copper rings such as are used on shells to engage the rifling of a barrel. These rings must be of extreme accuracy although only used once and the saving of material, therefore, is a most important item, while the cost of manufacture in view of the accuracy required is relatively great, and economy in the production in any degree is of great saving, and the aggregate economy in the production of such articles, as compared with methods heretofore used, is therefore of great value.

Furthermore, the physical qualities of the finished articles, for which this process is particularly intended, must meet very stringent requirements, for instance, molecular structure of cast copper would not have the tensile strength, ductility or be susceptible to the treatment necessary to apply a finished rifling band to a shell, and my process, therefore, converts the structure of the metal in passing it through successive steps in my process in order that it may fully meet all of the physical requirements of the finished article. For other reasons my process, it will be seen, is a great advance or improvement in the art of manufacturing articles of this character.

In the particular application of my process which is herein described in detail, it will be understood that various modifications may be made, and the process in whole or part may be applied in many ways, but to illustrate the same I will now describe the process in the particular form illustrated in the accompanying drawings in which:

Figure I is a broken and part sectional view of the engaging press dies for the first step, with an interposed blank.

Fig. II is a section of a blank after the operation of pressing in the dies shown in Fig. I.

Fig. III is a fragmentary side view of a dressing and facing tool with a blank shown in dotted lines in position for the operation.

Fig. III<sup>A</sup> is an edge view of the dressing and facing tool shown in Fig. III.

Fig. IV is a fragmentary and part sectional view of the engaging dies with a blank interposed for an intermediate step of shaping and sizing.

Fig. V is a fragmentary and part sectional view of the engaging press punch dies for the next step, with an interposed blank.

Fig. VI is a fragmentary and part sectional view of the engaging punch dies for sizing the article nearing completion or completing it, with an interposed ring in near finished condition.

Fig. VII is a side view of an expanding arbor holding the near finished ring in position and with an edge finishing tool adjusted to edge-finish same, and Fig. VII<sup>A</sup> is an end view of the expanding arbor with adjacent coöperating tool.

Fig. VIII is a fragmentary and part sectional view of the engaging die ends for producing in an alternate way a blank which would be otherwise produced in the steps provided for the tool illustrated in Fig. I.

Fig. IX is a section of the blank after treatment as in Fig. VIII.

In the first form of my process it will now be seen that I provide a cast ring A having the required amount of metal to produce the finished article with the least possible waste or scrap. This blank is faced or dressed by means of the tool illustrated in Figs. III and III<sup>A</sup>, in order to remove any foreign matter from both faces, so that surface impurities such as are usual in cast metal, are removed before any treatment of the metal begins.

This blank A is then placed between the head and base dies B and C of a powerful press centrally located in the base die C a sizing block D is concentrically surrounded by an outside diameter size die E, leaving an annular space between the two having the predetermined size for this step in the process. The top die or press head B is then lowered and the required pressure applied to effect a flow of the metal in the blank A, until the head B reaches a predetermined position suitably limited by the other dies or inter-engaging parts of the press, to transform the blank into a section A¹. The blank may be formed into the section shown at A³ in Fig. 5, by one operation and when the conditions are suitable this would be done; but there may be intermediate pressing operations.

Fig. IV shows the engaging ends of opposed press dies in which the top block J has a flat surface and the pressure is applied on the top of the blank A² and forces the blank against the upper end of the base die K, which has a beveled annular end surrounding the center size block L, while the base die is surrounded by an annular fixed block M. Upon the application of the pressure to the top die J, the blank A² is subjected to sufficient pressure to cause slight deformation and flow of material as to give the ring the section as shown at A³.

In Fig. V the engaging dies include the top punch N and the annular die P, with a suitably rounded upper corner p, and for centering the blank an annular recess p' as shown in dotted lines. The action of the punch in this step forces the thickened inner end of the blank into the die P, the rounded edge n of the punch coöperating with the rounded edge p of the die, causing the metal to yield with the minimum chance of fracture and causing the gradual increase of the pressure of the metal as it enters the die to the point where movement of the punch end will result in a flow of the metal in the blank down the side of the die, with the final position of the punch producing an exact size of thickness of the ring in edge-on position as desired for the finished article of manufacture.

On the punch N a sleeve Q slides down toward the end of the punch after the punch has performed its operation, and the sleeve Q operated by the power of the press strips the ring from the end of the punch and drops it as a finished article, except for any additional sizing to greater accuracy that might be desired.

In Fig. VI there are shown the engaging ends of press dies for a further finishing step if desired, in which the top punch R with the shoulder, as shown, and the end R', sizes the internal dimensions of the ring and presses the top edge of the ring downward a predetermined extent suitably limited by engaging of the dies or by mechanism of the press as predetermined, while the block S limits the outside diameter and sizes the same in its operation, and the lower punch T finishes the lower edge of the ring A⁴. After the press has been applied in this step, the top punch R is retrieved and as the greatest friction will be between the outside of the ring and die S, the ring remains in the die and the punch is self-stripping. Thereupon the lower punch T advances a suitable distance and strips the blank A⁴ out of the die S.

The tools shown in Figs. III and III^A provide for a blank being held by suitable tongs or other suitable tool, between the faces G—G. The interior surfaces g of these plates G are accurate and may be roughened as a file, and are of hard metal to retain their size during continuous use sufficiently long to avoid too frequent replacement or adjustment. The shaft H supporting one of these dressing plates G may be fixed and the shaft H' supporting the other pressing plate may be movable and limited in motion to give the finished dressed or faced blank predetermined thickness. This step is to remove, with the least possible cost of labor, the minimum surface necessary to eliminate objectionable surface material of the casting. When so dressed the blank is ready for the pressing process.

To complete most accurately the size of the finished article, the ring A⁴ may be clutched to an expanding mandrel U, as shown in Figs. VII and VII^A, in which jaws in any usual manner engage the interior of the ring in order to hold it accurately, and the tool V with the cutting edges v—v is advanced to dress the edges of the ring to the exact final size desired.

In all of the steps in this process the successive sections from the blank to the finished article are so proportioned that each operation will cause no greater flow or distortion of the metal than it will stand, depending upon the size of article in operation and quality of the material. In the production of rifling-bands for shells, this material is usually copper although alloys having aluminum have been given consideration, and my process has primarily the object of producing copper rings of this character. To insure the greatest economy in power required for the presses or punches, and to avoid any fracturing or checking of the material, the amount of flow involved in successive steps is accurately determined and proportioned.

While I have described the process for producing such finished rings from the cast blank, it is sometimes of great importance to economize the production by the use of blanks left over from other manufacture and which would otherwise be part waste or scrap. In Fig. VIII I have illustrated the engaging dies suitable for the treatment of a blank A', which in this case is considered to be a blank of sheet cooper left over after annular rings of copper have been punched out of a larger sheet, leaving the innermost disk of a size too small to be otherwise used. With such a blank of sheet metal placed between the press head W and the punch X, the pressure is applied to the extent requisite to cause a flow of the metal from between the punch and the face of the press block W radially outward in all directions. This pressure is continued until the metal flows to fill the space as shown around the end of the punch X, and above the die Y, and limited in its external diameter by the annular press block Z. In the completion of this process the blank takes the form A'—1, as indicated in dotted section and as shown in Fig. IX, with a central thin web of the minimum thickness possible when bringing such a punch die to the face of the press block W. After the production of a blank in this manner the central thin web is punched out as is usual in dressing flash off articles in press work, and the blank is then ready to progress through the steps as shown.

In the face pressing tool shown in Figs. III and III$^A$, as stated the shaft H' may be movable, and this may take the form of a vibratory motion produced by any suitable mechanism, with the object of having the plate G attached to H', vibrate, or so move that in dressing the blank the character of the chips may be made suitable for a product used in the arts. Such powdered or small chips of copper are specially produced in the arts today, and have a market value even more than the plain metal, so that this step in the process, instead of producing waste and loss, can by using such a tool as I describe, be made into a valuable by-product of my process.

It will thus be seen that a blank may be used in this process, which has not the requisite physical characteristics for the finished article, and the proper proportioning of the successive change in section of treatment by my process is effected with a degree of flow metal, or with a suitable amount of change in section by drawing of the metal, so that the finished article will have a molecular structure or grain and all of the qualities required to pass the physical test necessary to meet the requirements of use to which the finished articles will be subjected.

In the successive steps I observe care to avoid any change in section in excess of what would cause fracture or other deleterious effect upon the physical quality of the metal. In the preferred method, the cast blanks are heated before the first step above described. It will be understood, however, that the casting is first scoured and preferably pickled and cleaned before the press process begins. From the beginning of the press process I, therefore, start with a predetermined, very accurate amount of metal for each ring necessary for the finished article, thereby reducing to a minimum the amount of scrap in manufacture.

The importance and value of my process may be better appreciated by a general comparison with the methods now in use. It is well known that the so-called Ward method involves the casting of a ring of greater dimensions, but of smaller diameter than the finished article, with larger sectional area, and the rolling of this is intended to put the metal in proper physical condition and to proper size. Casting these horizontal, which is necessary to have the material homogeneous around the ring, results in an irregular top edge and therefore a considerable scrap when dressed for finishing. The rejections of these rings are made when they are finished, and it is well known that the percentage of rejections by this method is large, therefore the waste labor on all rejections involves a great waste. Other methods such as the hydraulic from a button-shaped ingot, result finally in a tube with a very irregular top edge and a very considerable amount of waste metal in the bottom, and involves also a great percentage of scrap, in addition to which the tube is not truly concentric and truing involves further loss of scrap and cost of labor, so that such process is relatively far more expensive.

It is principally my intention to utilize the process for large rings from 5" diameter and larger, which cannot economically be made from sheet disks or tubes, for reasons well known to manufacturers of this class of article.

It may be emphasized that the blanks for my preferred form of process are of a shape suitable for the most economical casting and may be cast with the maximum certainty of securing homogeneous metal throughout the blanks, and with a minimum of waste in the gates, and with the simplest and cheapest labor involved in producing the molds. It must also be borne in mind that articles of this character are subjected to the most stringent inspection, but the inspection is made of the finished article and all of the labor is spent before the acceptability of the article is determined, which emphasizes to the greatest extent the value of the process which insures the maximum amount of uniformity in the finished product and the greatest certainty of predetermining perfection and reducing the rejections of the finished articles to a minimum.

It will be understood that my process may be variously applied, although it is in particular a great saving in economy in the production of this particular article; and various changes may be made in the material, in the dimensions and in the application of my process without departing from the essence of my claims,—but what I claim and desire to secure by Letters Patent is:

1. A process for making annular rings of the character described, comprising the production of a cast blank, limiting the material of said ring against flow in an inward direction, applying normal pressure to a face of the same and simultaneously throughout an annular area of the face, to cause a flow of the metal simultaneously throughout the blank and punching the same to produce an end-on ring with a flow of metal to produce the final desired physical characteristics, substantially described.

2. A process for the manufacture of rifling rings for shells, consisting of preparing a flat annular ring, limiting the material of said ring against radial flow, applying pressure simultaneously over the entire face of the ring to the point of causing a simultaneous flow of metal throughout the ring to change its physical characteristics, punching the same to form an end-on ring, and finish-dressing the same.

3. A process for making end-on rings, consisting of producing an annular flat ring blank, face-dressing the same by the removal of granular material, limiting the material of said ring against radial flow, applying pressure simultaneously throughout the face and substantially normal to the face of the ring, and punching the ring, whereby a flow of material is effected simultaneously throughout an annular portion of the ring sufficient to change the molecular structure of the metal, for the purpose described.

4. A process for making annular rings, comprising the production of a cast metal blank, applying pressure substantially normal to the face thereof to an extent causing a flow of the metal, supporting said blank during the flow within the confines of sizing dies and applying pressure to the resultant annular ring to transform the same into a tubular ring.

5. A process for making copper bands for shells, consisting of producing a blank of a cubic content substantially the same as the cubic content of the ultimate finished article, with due allowance for dressing and shrinkage, dressing the blank, limiting the material of said ring against flow in an inward direction and transforming the molecular structure of the metal of the blank by the application of pressure substantially normal to a face of the blank and simultaneously on the entire face of the blank, to an extent causing flow of the metal, and subjecting said ring to a finishing operation to form the tubular band.

6. A process for making metal bands, comprising the production of an annular metal blank, confining the blank between dies having opposed faces disposed to induce a flow of metal in a radial direction, applying pressure substantially normal to the face of the blank to an extent causing a flow of the metal, supporting said blank during the pressing with means for limiting the flow of material in a radial direction, and applying pressure to the resultant annular ring to transform the same into a tubular ring.

7. A process for making metal bands, comprising the production of an annular metal blank, confining the blank between dies having opposed faces disposed to induce a flow of metal radially inwardly, applying pressure substantially normal to the face of the blank to an extent causing a flow of the metal radially inward, supporting said blank during the pressing with means limiting the flow of material in a radially inward direction, and applying pressure to the resultant annular ring to transform the same into a tubular ring.

In testimony whereof I have signed my name to this specification, in the presence of two subscribing witnesses, this 9th day of January, 1916.

FRANK MOSSBERG.

Witnesses:
ELEANOR S. ECKARDT,
JOHN DARBY.